(12) United States Patent
Hera et al.

(10) Patent No.: US 10,904,396 B2
(45) Date of Patent: *Jan. 26, 2021

(54) MULTI-CHANNEL RESIDUAL ECHO SUPPRESSION

(71) Applicant: Bose Corporation, Framingham, MA (US)

(72) Inventors: Cristian Marius Hera, Lancaster, MA (US); Elie Bou Daher, Marlborough, MA (US); Ankita D. Jain, Westborough, MA (US)

(73) Assignee: Bose Corporation, Framingham, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/744,499

(22) Filed: Jan. 16, 2020

(65) Prior Publication Data

US 2020/0153973 A1    May 14, 2020

Related U.S. Application Data

(63) Continuation of application No. 15/668,073, filed on Aug. 3, 2017, now Pat. No. 10,542,153.

(51) Int. Cl.
*H04M 9/08* (2006.01)
*H04B 3/23* (2006.01)
*G10L 21/0208* (2013.01)

(52) U.S. Cl.
CPC ............. *H04M 9/082* (2013.01); *H04B 3/23* (2013.01); *G10L 2021/02082* (2013.01); *H04M 9/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 6,658,107 B1* | 12/2003 | Sorqvist | ................. | H04B 3/21 379/406.04 |
| 6,799,062 B1* | 9/2004 | Piket | ..................... | H04M 9/082 379/388.01 |
| 2005/0063536 A1* | 3/2005 | Myllyla | ................ | H04M 9/082 379/406.08 |
| 2005/0175129 A1* | 8/2005 | Roovers | ................ | H04M 9/082 375/350 |
| 2010/0150376 A1* | 6/2010 | Itou | ........................ | H04M 9/082 381/94.1 |
| 2011/0135105 A1* | 6/2011 | Yano | ...................... | H04B 3/235 381/66 |
| 2013/0301840 A1* | 11/2013 | Yemdji | ..................... | H04B 3/20 381/66 |

(Continued)

*Primary Examiner* — Akelaw Teshale
(74) *Attorney, Agent, or Firm* — Bose Corporation

(57) ABSTRACT

Audio systems and methods for suppressing residual echo are provided. First and second audio program content signals are received, and a residual signal from an echo canceler is received. A first spectral mismatch is determined based at least upon a cross power spectral density of the first program content signal and the residual signal. The first spectral mismatch is associated with an operational state of the audio system. The residual signal is filtered to reduce residual echo, based at least upon the first spectral mismatch, a spectral density of the first program content signal, and a spectral density of the residual signal.

18 Claims, 8 Drawing Sheets

(56) References Cited

U.S. PATENT DOCUMENTS

2017/0047072 A1\* 2/2017 Eriksson ............... G10L 19/008
2018/0367674 A1\* 12/2018 Schalk-Schupp ........................... G10L 21/0264

\* cited by examiner

MULTI-CHANNEL RESIDUAL ECHO SUPPRESSION

CROSS REFERENCE TO RELATED APPLICATIONS

This application claims the benefit under 35 U.S.C. § 120 to co-pending U.S. patent application Ser. No. 15/668,073 titled MULTI-CHANNEL RESIDUAL ECHO SUPPRESSION filed on Aug. 3, 2017.

This application is related to U.S. patent application Ser. No. 15/667,988 titled EFFICIENT REUTILIZATION OF ACOUSTIC ECHO CANCELER CHANNELS filed on Aug. 3, 2017, and to U.S. patent application Ser. No. 15/668,237 titled MITIGATING IMPACT OF DOUBLE TALK FOR RESIDUAL ECHO SUPPRESSORS filed on Aug. 3, 2017, each of which is incorporated herein by reference in its entirety for all purposes.

TECHNICAL FIELD

Aspects and examples of the present disclosure are directed generally to voice and audio systems and methods, and in some examples, more specifically to systems and methods for removing acoustic echo signals from microphone signals.

BACKGROUND

Audio systems, especially automobile audio systems, are used to produce acoustic signals for various purposes such as entertainment (e.g., music, talk radio, sports), navigation (e.g., route guidance), and communication (e.g., telephone calls). Some such audio systems include one or more microphones intended to pick up a user's voice for certain applications, such as the near end of a telephone call or for commands to a virtual personal assistant. The acoustic signals produced by the audio system also contribute to the microphone signals, and may undesirably interfere with processing the user's voice signal.

SUMMARY

Aspects and examples are directed to audio systems and methods that suppress, or reduce, residual echo from a multi-channel echo canceler. Conventional residual echo suppressors, or post filters, are designed for a single audio content channel. Aspects and examples disclosed herein accommodate multiple audio source channels, and allow for the multiple audio source signals to be correlated or uncorrelated. Acoustic echo cancelers allow some residual echo to remain in their output signals, due in part to a mismatch between echo cancelation filter coefficients and the actual echo path, e.g., the echo cancelation filter does not perfectly model the actual echo path. The mismatch for each channel is characterized as a spectral mismatch by the residual echo suppression systems and methods disclosed herein, and a spectral post filter is controlled to suppress or reduce the effect of at least a portion of the residual echo based upon the spectral mismatches.

According to one aspect, a method of suppressing residual echo is provided and includes receiving a first program content signal and a second program content signal, receiving a residual signal from an echo cancelation subsystem, determining a first spectral mismatch based at least upon a cross power spectral density of the first program content signal and the residual signal, determining a second spectral mismatch based at least upon a cross power spectral density of the second program content signal and the residual signal, and controlling a filter to filter the residual signal based upon the first spectral mismatch, the second spectral mismatch, a spectral density of the first program content signal, a spectral density of the second program content signal, and a spectral density of the residual signal.

In certain examples, controlling the filter includes calculating filter coefficients and providing the filter coefficients to the filter.

In some examples, controlling the filter to filter the residual signal is based upon previously determined first and second spectral mismatches during a period of time when a double-talk condition is detected.

In some examples, determining the first and second spectral mismatches are further based on a cross power spectral density of the first program content signal and the second program content signal.

Some examples include rendering the first program content signal in accord with a first selected sound stage configuration and rendering the second program content signal in accord with a second selected sound stage configuration.

Certain examples include storing the first spectral mismatch in a memory and associating the first spectral mismatch with a sound stage configuration.

Some examples include retrieving from a memory an initial first spectral mismatch based upon a selected sound stage configuration. The initial first spectral mismatch may be associated with the selected sound stage configuration.

Certain examples also include receiving a third program content signal and determining a third spectral mismatch based at least upon a cross power spectral density of the third program content signal and the residual signal, and wherein controlling the filter to filter the residual signal includes controlling the filter to filter the residual signal additionally based upon the third spectral mismatch and the spectral density of the third program content signal.

According to another aspect, a residual echo suppression system is provided. The residual echo suppression system includes a plurality of content signal inputs, each configured to receive an audio signal, a residual input configured to receive a residual signal from an echo cancelation system, a processor configured to determine a plurality of spectral mismatches, each based at least upon a cross power spectral density involving at least one of the audio signals, and a filter configured to filter the residual signal based at least upon the plurality of spectral mismatches to provide an output signal.

In some examples, each of the plurality of spectral mismatches are based at least upon a cross power spectral density of one of the audio signals and the residual signal.

In certain examples, the processor is further configured to calculate filter coefficients based at least upon the plurality of spectral mismatches, a spectral density of the residual signal, and a spectral density of each of the audio signals, and to provide the filter coefficients to the filter.

In some examples, the processor is further configured to determine the plurality of spectral mismatches during a period of time when a double-talk condition is not detected, and to maintain previously determined spectral mismatches during a period of time when a double-talk condition is detected.

Certain examples include a memory configured to store at least one of the plurality of spectral mismatches and to associate the stored spectral mismatch with a sound stage configuration.

In some examples, the processor is further configured to retrieve from a memory a stored spectral mismatch, based upon a selected sound stage configuration, and to use the retrieved spectral mismatch as at least one of the determined spectral mismatches.

Some examples also include a signal processing subsystem coupled to the plurality of content signal inputs and configured to provide a processed signal based upon at least a portion of the plurality of audio signals to a loudspeaker for rendering an acoustic signal in accord with a first selected sound stage configuration.

In certain examples, the processor is configured to determine the plurality of spectral mismatches based upon frequency components of 12,000 Hz or less.

According to yet another aspect, an audio system is provided that includes a plurality of inputs, each of the plurality of inputs to receive an audio signal, a signal processing subsystem coupled to the plurality of inputs and configured to provide a processed signal based upon at least a portion of the plurality of audio signals to a loudspeaker for rendering an acoustic signal, a microphone input to receive a microphone signal having an echo component of the acoustic signal, an echo cancelation subsystem configured to provide an estimated echo signal from the plurality of audio signals, to receive the microphone signal, and to subtract the estimated echo signal from the microphone signal to provide a residual signal, and a residual echo suppression subsystem configured to determine a plurality of spectral mismatches, each of the plurality of spectral mismatches based at least upon a cross power spectral density of the residual signal and one of the plurality of audio signals, and to filter the residual signal based at least upon the plurality of spectral mismatches to provide an output signal.

In some examples, the residual echo suppression subsystem is further configured to calculate filter coefficients based at least upon the plurality of spectral mismatches, a spectral density of the residual signal, and a spectral density of each of the audio signals, to filter the residual signal.

In some examples, the residual echo suppression subsystem is further configured to determine the plurality of spectral mismatches during a period of time when a double-talk condition is not detected, and to maintain previously determined spectral mismatches during a period of time when a double-talk condition is detected.

Some examples include a memory configured to store at least one of the plurality of spectral mismatches and to associate the stored spectral mismatch with a sound stage configuration.

In certain examples, the residual echo suppression subsystem is further configured to retrieve from a memory a stored spectral mismatch, based upon a selected sound stage configuration, and to use the retrieved spectral mismatch as at least one of the determined spectral mismatches.

In some examples, the residual echo suppression subsystem is further configured to determine the plurality of spectral mismatches based upon frequency components of 12,000 Hz or less.

Still other aspects, examples, and advantages are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples, and are incorporated in and constitute a part of this specification, but are not intended as a definition of the limits of the invention. In the figures, identical or nearly identical components illustrated in various figures may be represented by a like numeral. For purposes of clarity, not every component may be labeled in every figure. In the figures.

DETAILED DESCRIPTION

Figure 1:
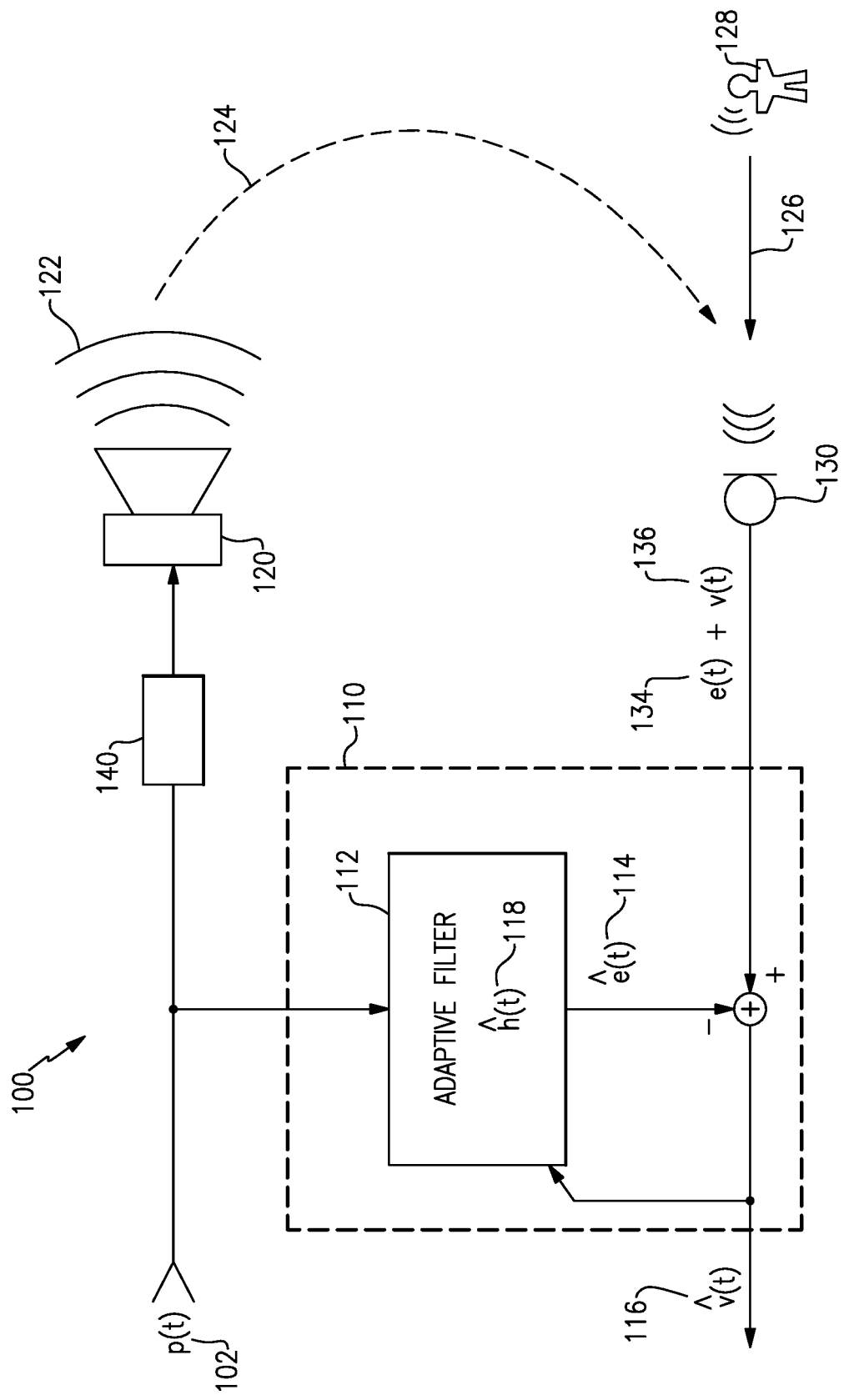
FIG. 1 is a schematic diagram of an example audio system including echo cancelation.

Aspects of the present disclosure are directed to audio systems and methods that provide echo reduction in a multi-channel environment. Acoustic echo cancelers may fail to completely remove an echo component in a microphone signal, leaving a residual echo component. Aspects and examples disclosed herein reduce (e.g., suppress) the residual echo in the microphone signal after the action of one or more acoustic echo cancelers, and are adapted to operate in a multi-channel environment.

Audio systems, especially automotive audio systems, may produce acoustic signals in an environment, e.g., a vehicle compartment, for the benefit of people in the environment. The acoustic signals may be for entertainment, information, communication, and navigation, for example. Such audio systems may also accept acoustic input from the occupants, e.g., one or more people may verbally speak and their voices may be picked up by the audio system, e.g., via one or more microphones, for various purposes such as telephone conversations, verbal commands to a navigation system or a virtual personal assistant, and the like. When the audio system renders an acoustic signal, e.g., via a loudspeaker, the microphone(s) may also pick up the rendered acoustic signal in addition to the user's voice. For example, the user may be having a phone conversation and listening to the radio at the same time, and the microphone will pick up both the user's voice and the radio program. A portion of the microphone signal may therefore be due to the audio system's own acoustic production, and that portion of the microphone signal is deemed an echo signal. In such cases, an acoustic echo canceler may be used to reduce or remove the echo signal portion from the microphone signal. When multiple loudspeakers and/or multiple audio signal sources are used, there may be multiple acoustic echo cancelers involved. After the action of one or more echo cancelers, a portion of the echo signal may remain, and is deemed a residual echo. Aspects and examples disclosed herein suppress the residual echo by applying a post filter ("post" refers to the filter's action occurring after the echo canceler). The post filter applies spectral enhancement to reduce (suppress) spectral content that is likely due to residual echo and not a user's vocalizations, thereby enhancing the speech content in the signal relative to the non-speech content.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

FIG. 1 illustrates an example audio system 100 that includes an echo canceler 110, one or more acoustic drivers 120, and one or more microphones 130. The audio system 100 receives a program content signal 102, p(t), that is converted into an acoustic program signal 122 by the one or more acoustic drivers 120. The acoustic drivers 120 may have further processing component(s) 140 associated with them, such as may provide array processing, amplification, equalization, mixing, etc. Additionally, the program content signal 102 may include multiple tracks, such as a stereo left and right pair, or multiple program content signals to be mixed or processed in various ways. The program content signal 102 may be an analog or digital signal and may be provided as a compressed and/or packetized stream, and additional information may be received as part of such a stream, such as instructions, commands, or parameters from another system for control and/or configuration of the processing component(s) 140, the echo canceler 110, or other components.

The block diagrams illustrated in the figures, such as the example audio system 100 of FIG. 1, are schematic representations and not necessarily illustrative of individual hardware elements. For instance, in some examples, each of the echo canceler(s) 110, the processing component(s) 140, and other components and/or any portions or combinations of these, may be implemented in one set of circuitry, such as a digital signal processor, a controller, or other logic circuitry, and may include instructions for the circuitry to perform the functions described herein.

A microphone, such as the microphone 130, may receive each of an acoustic echo signal 124, an acoustic voice signal 126 from a user 128, and other acoustic signals such as background noise and/or road noise. The microphone 130 converts acoustic signals into, e.g., electrical signals, and provides them to the echo canceler 110. Specifically, when a user 128 is speaking, the microphone 130 provides a voice signal 136, v(t), and an echo signal 134, e(t), as part of a combined signal to the echo canceler 110. The echo canceler 110 functions to attempt to remove the echo signal 134 from the combined signal to provide an estimated voice signal 116, $\hat{v}(t)$. The echo canceler 110 works to remove the echo signal 134 by processing the program content signal 102 through a filter 112 to produce an estimated echo signal 114, $\hat{e}(t)$, which is subtracted from the signal provided by the microphone 130.

For example, the acoustic program signal 122 causes the echo signal 134. If the filter 112 performs well at providing an estimated echo signal 114, it will perform well at removing the echo signal 134 from the signal provided by the microphone 130. As a result, the estimated voice signal 116, $\hat{v}(t)$, will be a good representation of the actual voice signal 136, v(t).

The echo canceler 110 may include an adaptive algorithm to update the filter 112, at intervals, to improve the estimated echo signal 114. Over time, the adaptive algorithm causes the filter 112 to converge on satisfactory parameters that produce a sufficiently accurate estimated echo signal 114. Generally, the adaptive algorithm updates the filter during times when the user 128 is not speaking, but in some examples the adaptive algorithm may make updates at any time. When the user 128 speaks, such is deemed "double talk," and the microphone 130 picks up both the acoustic echo signal 124 and the acoustic voice signal 126. Regarding the terminology, the user 128 is "talking" at the same time as one or more acoustic drivers 120 are producing acoustic program content, or "talking," hence, "double talk."

The filter 112 may apply a set of filter coefficients to the program content signal 102 to produce the estimated echo signal 114, $\hat{e}(t)$. The adaptive algorithm may use any of various techniques to determine the filter coefficients and to update, or change, the filter coefficients to improve performance of the filter 112. In some examples, the adaptive algorithm may operate on a background filter, separate from the filter 112, to seek out a set of filter coefficients that performs better than an active set of coefficients being used in the filter 112. When a better set of coefficients is identified, they may be copied to the filter 112 in active operation.

Such adaptive algorithms, whether operating on an active filter or a background filter, may include, for example, a least mean squares (LMS) algorithm, a normalized least mean squares (NLMS) algorithm, a recursive least square (RLS) algorithm, or any combination or variation of these or other algorithms. The filter 112, as adapted by the adaptive algorithm, converges to apply an estimated transfer function 118, $\hat{h}(t)$, which is representative of the overall response of the processing 140, the acoustic driver(s) 120, the acoustic environment, and the microphone(s) 130, to the program content signal 102. The transfer function is a representation of how the program content signal 102 is transformed from its received form into the echo signal 134.

While the echo canceler 110 works to remove the echo signal 134 from the combined microphone signal, rapid changes and/or non-linearities in the echo path prevent the echo canceler 110 from providing a precise estimated echo signal 114 to perfectly match the echo signal 134, and a residual echo will remain at the output. According to aspects and examples enclosed herein, the residual echo is reduced, or suppressed, by the addition of a post filter to spectrally enhance the estimated voice signal 116.

Figure 2:
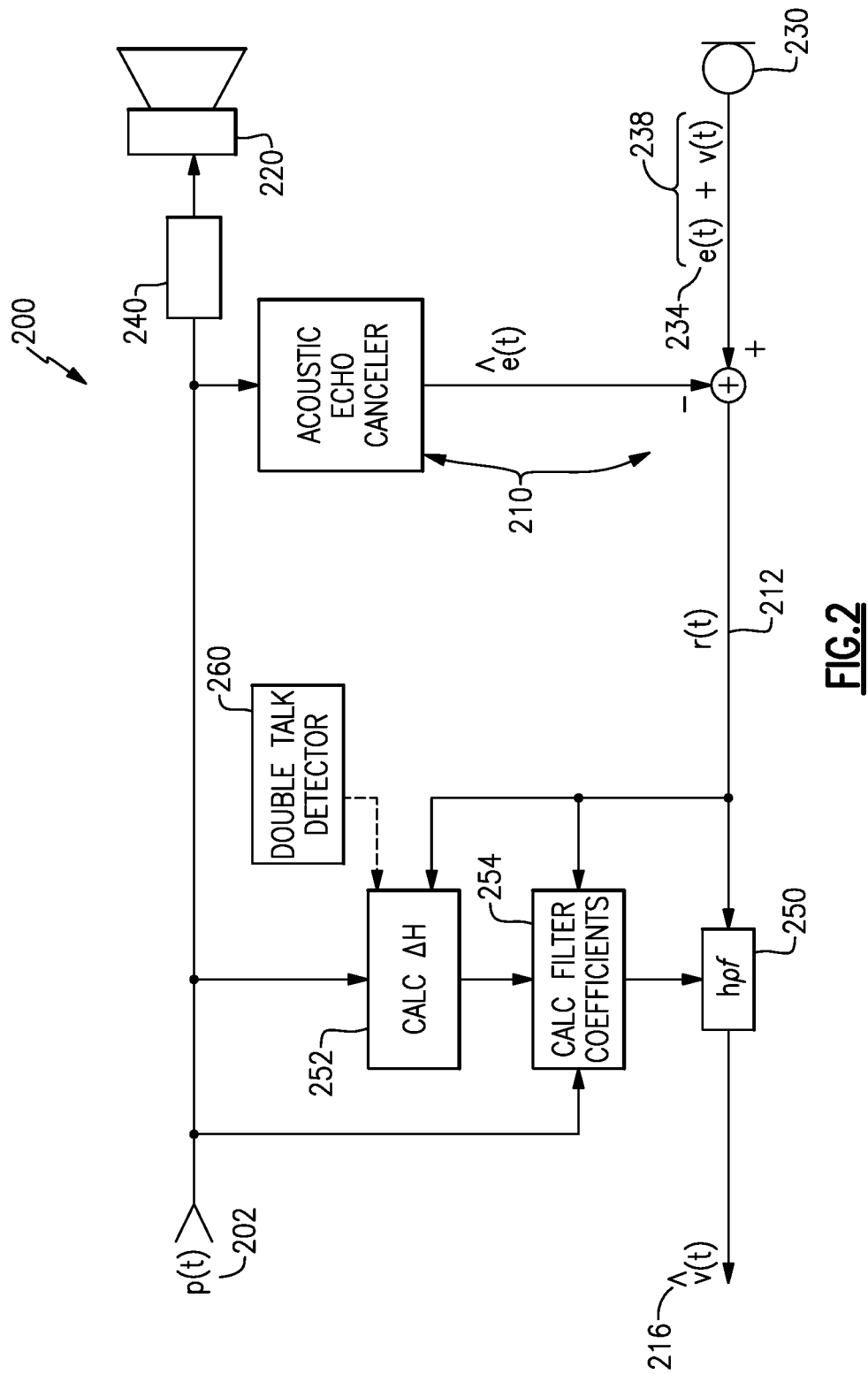
FIG. 2 is a schematic diagram of an example audio system including residual echo suppression.

FIG. 2 illustrates an example audio system 200 that includes an echo canceler 210, one or more acoustic drivers 220, one or more microphones 230, audio signal processing 240, and a post filter 250. Similar to the audio system 100 of FIG. 1, the audio system 200 receives a program content signal 202 and converts it into an acoustic program signal by the one or more acoustic drivers 220, and the echo canceler 210 operates to remove or reduce an echo signal 234 from a combined signal 238 provided by the microphone 230. The resulting signal 212 may include a residual echo component, as discussed above. The post filter 250 operates to suppress the residual echo component with spectral filtering to produce an improved estimated voice signal 216.

The post filter 250 is supported by a spectral analysis block 252 that characterizes the spectral power and/or spectral content of the resulting signal 212 relative to the program content signal 202. The spectral analysis block 252 calculates a spectral mismatch, ΔH, (also termed echo mismatch herein) between the actual echo path and the acoustic echo canceler 210. The actual echo path is, for example, the entire path taken by the program content signal 202 from where it is provided to the echo canceler 210, through the processing 240, the acoustic driver 220, the acoustic environment, and through the microphone 230. The actual echo path may further include processing by the microphone 230 or other supporting components, such as array processing, for example.

To determine the spectral mismatch, the spectral analysis block 252 calculates a ratio of power spectral density of the resulting (residual) signal 212 to the power spectral density of the program content signal 202, across a number of frequency blocks or bins. In simplified mathematical terms, the spectral analysis block 252 calculates ΔH at intervals, in accord with equation (1).

$$|\Delta H|^2 = \frac{S_{rr}}{S_{pp}} \quad (1)$$

Wherein $S_{rr}$ is the power spectral density of the resulting (or residual) signal 212 (from the echo canceler 210) and $S_{pp}$ is the power spectral density of the program content signal 202, which is the ultimate source of the echo. In some examples, the power spectral densities used may be time-averaged or otherwise smoothed or low pass filtered to prevent sudden changes (e.g., rapid or significant changes) in the calculated spectral mismatch.

In some examples, to accurately calculate the echo mismatch, the spectral analysis block 252 may be configured to calculate the echo mismatch only during periods when a double talk condition is not detected, e.g., by a double talk detector 260. For example, when a user is speaking within the acoustic environment of the audio system 200, the resulting signal 212 includes a component that is the user's speech. In this case, the resulting signal 212 is not representative of the residual echo, e.g., the mismatch of the echo canceler 210 relative to the actual echo path, because the user is speaking. Accordingly, the double talk detector 260 operates to indicate when double talk is detected, and the spectral analysis block 252 may stop calculating ΔH during such periods. The double talk detector 260 may be any suitable system, component, algorithm, or combination thereof.

Regarding the use of symbols herein, a capital letter, e.g., H, generally represents a term, signal, or quantity in the frequency or spectral domain, and a lowercase letter, e.g., h, generally represents a term, signal, or quantity in the time domain. Relation between time and frequency domain is generally well known, and is described at least under the realm of Fourier mathematics or analysis, and is accordingly not presented herein. Additionally, signals, transfer functions, or other terms or quantities represented by symbols herein may be operated, considered, or analyzed in analog or discrete form. In the case of time domain terms or quantities, the analog time index, e.g., t, and/or discrete sample index, e.g., n, may be interchanged or omitted in various cases. Likewise, in the frequency domain, analog frequency indexes, e.g, f, and discrete frequency indexes, e.g., k, are omitted in most cases. Further, relationships and calculations disclosed herein may generally exist or be carried out in either time or frequency domains, and either analog or discrete domains, as will be understood by one of skill in the art. Accordingly, various examples to illustrate every possible variation in time or frequency domains, and analog or discrete domains, are not presented herein.

As discussed above with reference to equation (1), the spectral analysis block 252 calculates the spectral mismatch, ΔH, across a number of frequency blocks or bins. Any number of frequency bins, across any suitable range of frequencies, may be selected to accommodate varying system requirements. For instance, in certain examples the power spectral density of signals may be taken across 64 frequency bins. In other examples, the signals may be analyzed across any suitable number of frequency bins, or a system adjustable number of frequency bins, for example from 32 frequency bins up to 256 frequency bins or more. Further, the frequency range may be limited to those frequencies deemed important for particular applications, such as the processing of human speech, which generally only requires a narrower frequency range than that which humans are capable of hearing. Accordingly, for example, the program content signal 202 may include content across a spectrum of 20 Hz to 20,000 Hz, while the microphone 230, the echo canceler 210, the post filter 250, and the spectral analysis block 252, may be configured to operate on a more limited frequency range, such as up to 5 kHz, 11 kHz, or 12 kHz, for example. In other examples, suitable frequency ranges may include 60 Hz to 8,000 Hz, or 100 Hz to 4,000 Hz, or any other suitable range depending upon the application. A selection of number of frequency bins may be related to a selection of frequency range in some examples, depending upon operating requirements. A broader frequency range may require a higher number of frequency bins to achieve a particular spectral resolution, for example.

As discussed above, the post filter 250 operates to suppress residual echo that is often the result of rapid changes and/or non-linearities in the acoustic environment, such as caused by a person moving his arms or turning his head, for example. Accordingly, the post filter 250 may be required to change its operating characteristics more quickly than, for example, an adaptive algorithm associated with the echo canceler 210. The spectral analysis block 252 may therefore be configured to calculate the spectral mismatch, ΔH, at a rather rapid rate, over short time intervals, e.g., many times per second.

In some examples, the ratio of power spectral densities, as described by equation (1), may be time averaged over a number of calculations, and the time averaged result may be used as the spectral mismatch, ΔH. For example, the spectral analysis block 252 may calculate a new spectral mismatch, ΔH, at each interval, according to equation (2), where the newly calculated spectral mismatch, ΔH(n), is based upon the ratio of power spectral densities as presented above with respect to equation (1), and the previously calculated spectral mismatch, ΔH(n−1), as well as a time-averaging weighting factor, δ. In other examples, the intervally calculated spectral mismatch may not be time averaged, or may be time averaged by some other suitable function.

$$|\Delta H(n)|^2 = (1-\delta) \cdot \frac{S_{rr}}{S_{pp}} + \delta \cdot |\Delta H(n-1)|^2 \quad (2)$$

Acknowledging the above discussion that the spectral analysis block 252 may be configured to stop calculating new spectral mismatches when double talk is detected, equation (2) may be re-written as equation (3).

$$|\Delta H(n)|^2 = \begin{cases} (1-\delta) \cdot \frac{S_{rr}}{S_{pp}} + \delta \cdot |\Delta H(n-1)|^2 & \text{far end single talk} \\ |\Delta H(n-1)|^2 & \text{otherwise} \end{cases} \quad (3)$$

The above discussion focuses on the operation of the spectral analysis block 252 to determine a spectral mismatch, ΔH, at any given time. Attention is now turned to the operation of the post filter 250 itself, and adaptation of the post filter 250 at particular instants in time by a coefficient calculation block 254. The post filter 250 suppresses residual echo in the resulting signal 212 (from the echo canceler 210) by, in some examples, reducing the spectral content of the resulting signal 212 by an amount related to the likely ratio of the residual echo signal power relative to the total signal power (e.g., speech and residual echo), by frequency bin.

In various examples, the post filter 250 may be configured to operate in the frequency domain or the time domain. Accordingly, use of the term "filter coefficient" is not intended to limit the post filter 250 to operation in the time domain. The terms "filter coefficients," "tap weights," or other comparable terms, may refer to any set of values applied to or incorporated into a filter to cause a desired response or a desired transfer function. In certain examples, the post filter 250 may be a digital frequency domain filter that operates on a digital version of the resulting signal 212 to multiply signal content within a number of individual frequency bins, by distinct values generally less than or equal to unity. The set of distinct values may be deemed filter coefficients.

In at least one example, the coefficient calculation block 254 calculates and provides to the post filter 250 a set of frequency bin multipliers according to equation (4).

$$H_{pf}(k) = \max\left\{1 - \beta \frac{S_{pp}(k) \cdot |\Delta H(k, n)|^2}{S_{rr}(k) + \rho}, H_{min}\right\} \quad (4)$$

With reference to equation (4) and the audio system 200 of FIG. 2, in at least one example the post filter 250 will multiply the resulting signal 212 by the value $H_{pf}(k)$, on a per frequency bin basis. The index "k" represents individual frequency bins. Equation (4) also imposes a minimum multiplier, $H_{min}$, to be applied to every frequency bin, thereby ensuring that no frequency bin is multiplied by less than the minimum. It should be understood that multiplying by lower values is equivalent to greater attenuation. It should also be noted that in the example of equation (4), each frequency bin is at most multiplied by unity, but other examples may use different approaches to calculate filter coefficients. The β factor is a scaling or overestimation factor that may be used to adjust how aggressively the post filter 250 suppresses signal content, or in some examples may be effectively removed by being equal to unity. The ρ factor is a regularization factor to avoid division by zero.

In certain examples, including examples that calculate filter coefficients using equation (4), the filter coefficients depend upon the most recently calculated spectral mismatch, ΔH, as well as the current power spectral density of the resulting signal 212 and the current power spectral density of the program content signal 202. As a reminder, the most recently calculated spectral mismatch, as discussed above, may be a frozen value due to the spectral analysis block 252 stopping new calculations when double talk is detected. The current power spectral densities of the resulting signal 212 and the program content signal 202, however, may continue to change at each moment in time. Accordingly, in certain examples, when double talk is detected, the spectral analysis block 252 stops calculating, or freezes, the spectral mismatch, ΔH, while the coefficient calculation block 254 continues to calculate and provide filter coefficients to the post filter 250. Accordingly, the post filter 250 may continuously update its operation based upon the current power spectral densities of the resulting signal 212 and the program content signal 202.

Figure 3A:
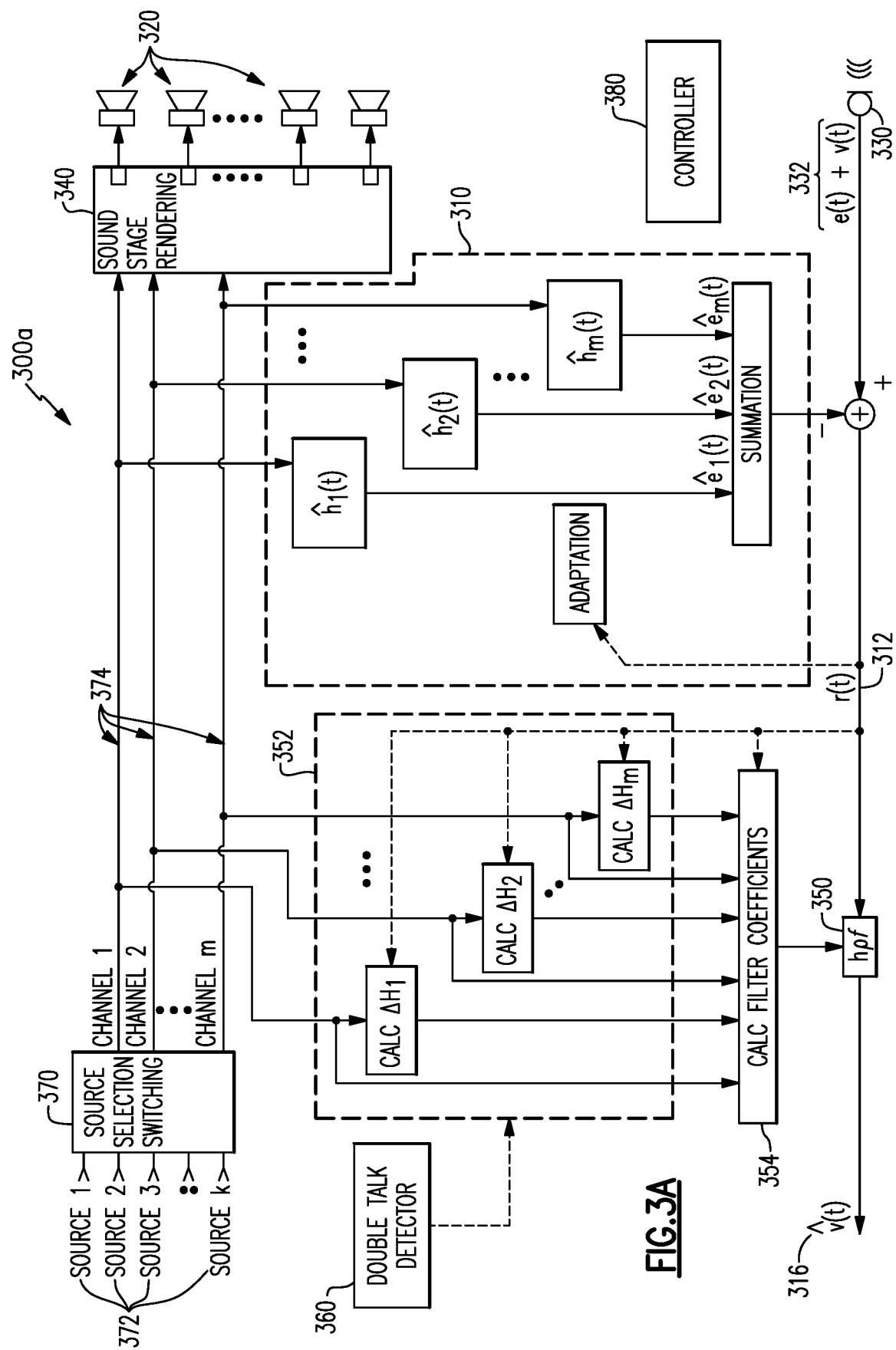
FIG. 3A is a schematic diagram of an example audio system including multi-channel echo cancelation and residual echo suppression.

FIG. 3A illustrates application of post filtering residual echo suppression in a multi-channel audio system in accord with aspects and examples disclosed herein. FIG. 3A shows an example multi-channel audio system 300a that includes source selection switching 370 to allow selection from among multiple sources 372 to provide one or more program content signals to individual content channels 374 for rendering as acoustic signals. The audio system 300a also includes a sound stage processor 340 to control a number of acoustic transducers 320, at least one microphone input and/or microphone 330 to pick up acoustic signals in the environment, including user voices and audio system echoes. An echo cancelation subsystem 310 is also included for estimating and removing the echo signal content of the audio signal provided by the microphone 330, as well as a post filter 350 to suppress residual echo and to provide an estimated voice signal 316. The post filter 350 is also supported by a spectral analysis subsystem 352 and a coefficient calculation block 354. The audio system 300a also includes a double talk detector 360, and a controller 380 to manage one or more components of the source selection switching 370, the sound stage processor 340, the echo cancelation subsystem 310, the post filter 350 and supporting components, and/or the double talk detector 360.

In some examples, the echo cancelation subsystem 310, spectral analysis subsystem 352, and the coefficient calculation block 354 may operate on signals or signal channels after processing by the sound stage processor 340, rather than prior to sound stage processing as shown in the figures. For example, the echo cancelation subsystem 310, spectral analysis subsystem 352, and the coefficient calculation block 354 may operate on signals provided directly to the acoustic transducers 320, before or after amplification. In other examples, there may be various signal processing before, after, or both before and after the provision of such signals to the echo cancelation subsystem 310, spectral analysis subsystem 352, and the coefficient calculation block 354.

In some examples, the microphone 330 may be an array of microphones, having array processing to steer beams toward sources of desired acoustic signals and/or away from noise sources, and may additionally or alternately steer nulls toward noise sources. In such examples, the controller 380 may further control such array processing components, or such array processing components may be alternately controlled and/or may be pre-configured for various operating characteristics.

Any of the sources 372 may include hardware for providing an audio signal, such as a radio tuner, navigation system, telephone system, and the like, or may include inputs to accept audio signals from an external device. For example, any of the sources 372 may include one or more physical electrical connections or wireless connections, or any combination of wired and wireless connections, and may include network interfaces to receive (and optionally to provide) various audio signals. Examples include audio jacks, such as 3.5 mm audio jacks, for example, Bluetooth® wireless interfaces and hardware, or the like, network interface jacks and/or connectors, such as an RJ-45 connector, for example, and wireless local area network (WLAN) interfaces and hardware, or any combination of these or other interfaces suitable for conveying audio signal content. Various of these or other interfaces may also include inputs to receive commands and control parameters, such as filter settings, equalization, volume control, or other sound stage parameters, etc.

The echo cancelation subsystem includes a number of echo cancelation filters, each of which is associated with a particular content channel 374. The content channels 374 provide content signals to the sound stage processor 340, from among the sources 372 (as selected by the source selection switching 370 under the control of the controller 380). The sound stage processor 340 provides various processing, such as equalization and loudspeaker routing, to drive the acoustic transducers 320 to generate acoustic sound fields in accordance with the various program content signals and sound stage parameters.

The various sources 372 may provide audio content to be rendered within the environment, such as an interior occupant compartment of a vehicle, and may include numerous types of audio sources, such as radios, telephones, navigation systems, etc. Each of the sources 372 and each sub-channel provided by the sources 372 may have differing requirements for sound stage rendering, such as equalization settings and routing to various acoustic transducers 320 or groups of acoustics transducers 320. The various echoes created or caused by the program content signal on each content channel 374 are attempted to be canceled by a respective echo canceler as part of the echo cancelation subsystem 310. As discussed above in the single-channel case, the echo cancelers may not achieve complete removal of echo signals and therefore a residual echo may remain as a component of a resulting signal 312 after action by the echo canceler subsystem.

Similar to the above audio system 200, the example audio system 300a includes a post filter 350 to suppress residual echo in the resulting signal 312. The post filter 350 works similarly to the examples described above with reference to FIG. 2, to apply spectral enhancement to enhance any user speech content with respect to non-speech content. Unlike the audio system 200 above, however, spectral mismatch calculations and filter coefficient calculations are handled in a different manner to accommodate the various program content signals among the multiple content channels 374.

A full mathematical development of the relationships between echo cancelers, residual signals, spectral mismatches, and spectral filter coefficients, for multiple content signals having various relationships to each other is beyond the scope of this disclosure. It should be noted, however, that equations (1), (2), (3), and (4) above, with respect to the audio system 200 of FIG. 2, require that the spectral analysis block 252 have access to the (residual) resulting signal 212 of the individual echo caused by the single program content signal 202. In the instant case of the example audio system 300a of FIG. 3A, however, the resulting signal 312 is the result of multiple source program content signals that cause a co-mingled echo signal that has been acted on by a number of echo cancelers. Accordingly, the equations above require modification to operate in the multi-channel environment of FIG. 3A, and the individual spectral analysis blocks within the spectral analysis subsystem 352 are configured to operate a bit differently than the spectral analysis block 252 of FIG. 2.

Specifically, each spectral analysis block within the spectral analysis subsystem 352 is associated with a certain content channel 374. With reference to equation (1), the power spectral density of a respective program content signal is calculable by the spectral analysis block because the respective program content signal is available to the individual spectral analysis block from the respective content channel 374. However, the power spectral density of a (residual) resulting signal associated with the respective program content signal is not available. Only an overall resulting signal 312, corresponding to the result of multiple program content signals and multiple echo cancelers, is available to each of the spectral analysis blocks within the spectral analysis subsystem 352. According to some examples, if it is assumed or enforced that the program content signals carried by the content channels 374 are statistically independent (e.g., uncorrelated), or nearly statistically independent, the spectral mismatch, $\Delta H_i$, for the i-th content channel 374 and the i-th echo canceler, is calculated by the i-th spectral analysis block according to equation (5).

$$\Delta H_i = \frac{S_{p_i r}}{S_{p_i p_i}} \qquad (5)$$

Wherein $S_{p_i r}$ is the cross power spectral density of the program content signal on the i-th content channel 374 and the resulting signal 312, and $S_{p_i p_i}$ is the power spectral density of the program content signal on the i-th content channel 374. It should be noted that the numerator of equation (5) is a cross power spectral density of two signals and not an individual power spectral density of one signal. In some examples, the content channels 374 may be enforced to be statistically independent by, for example, cross-correlating source sub-channels and separating out common signal content to be allocated to an additional content channel 374. In such cases, the additional content channel 374 allocated to common signal content may have a sound stage parameter that causes it to be rendered in the same manner as the common signal content would have been if it were not separated out, such as the case of common signal content between a left-right stereo pair, for example, which may be rendered to both left and right by the sound stage processor 340.

Similar to the case of the audio system 200 of FIG. 2, the spectral analysis subsystem 352 may apply time averaging, similar to equation (2) above, and may stop, or freeze, the calculation of spectral mismatches, $\Delta H_i$, as expressed for the single channel case in equation (3) above, when double talk is detected and indicated by the double talk detector 360. The coefficient calculation block 354 continues to calculate coefficients and provide them to the post filter 350, in certain examples. The coefficient calculation block 354 of FIG. 3A may be configured to operate differently from the coefficient calculation block 254 of FIG. 2, to accommodate the multiple channels of the example audio system 300. In certain examples, the coefficient calculation block 354 may calculate coefficients according to equation (6).

$$H_{pf}(k) = \max\left\{1 - \beta \frac{\sum_{i=1}^{m}[|\Delta H_i(k)|^2 \cdot S_{p_i p_i}(k)]}{S_{rr}(k) + \rho}, H_{min}\right\} \quad (6)$$

Equation (6) is similar to equation (4), but includes a summation of the product of the squares of the individual spectral mismatches, $\Delta H_i$, with the individual power spectral density of each of the program content signals, $S_{p_i p_i}$. Recall that $S_{p_i p_i}$ is the power spectral density of the program content signal on the i-th content channel 374. Accordingly, equation (6) includes "m" such power spectral densities, where "m" is the number of active content channels 374.

A further advantage that may be included in audio systems in accord with aspects and examples disclosed herein is an efficient use of spectral analysis blocks such that a large number of various sources 372 may be accommodated while including an efficient number of echo cancelers and spectral analysis blocks. For example, and with reference to FIG. 3B, a further example audio system 300b is shown, similar to the audio system 300a of FIG. 3A, but including storage 390 to store and retrieve filter coefficients for the echo cancelers (in storage portion 390a) and to store and retrieve spectral mismatches for the spectral analysis blocks (in storage portion 390b).

A change in operational status of the audio system, such as a change requested by user input, or a change requested by one of the sources 372, may create or change one or more transfer functions tracked by one or more of the echo cancelers, and accordingly may create or change one or more residual echo characteristics of the system. In the example audio system 300b of FIG. 3B, the echo cancelation filter coefficients and residual echo spectral mismatches may be stored from a prior instant in time when the audio system was operating in a particular state, and appropriate echo cancelation filter coefficients and residual echo spectral mismatches can be retrieved from the storage 390 and loaded into the echo cancelation filters and the spectral analysis blocks, respectively, when a change of operational state is requested. For example, a particular operational state may include source sub-channels having particular sound stage rendering parameters, and may further include particular microphone processing parameters for the microphone 330, such as array processing in some examples having numerous microphones. Accordingly, any particular set of source-stage-microphone settings may have respective "last used" filter coefficient and spectral mismatch data stored in the storage 390. The stored filter coefficient and spectral mismatch data can be retrieved when the audio system 300b is requested to operate at least one channel with the same (or similar) source-stage-microphone settings. Additionally, actively used filter coefficient and spectral mismatch data (as updated by adaptation) can be stored into the storage 390 when the audio system 300b is requested to cease operating the at least one channel with the particular source-stage-microphone settings, such as upon powering off or upon a new request to operate under different conditions.

Figure 3B:
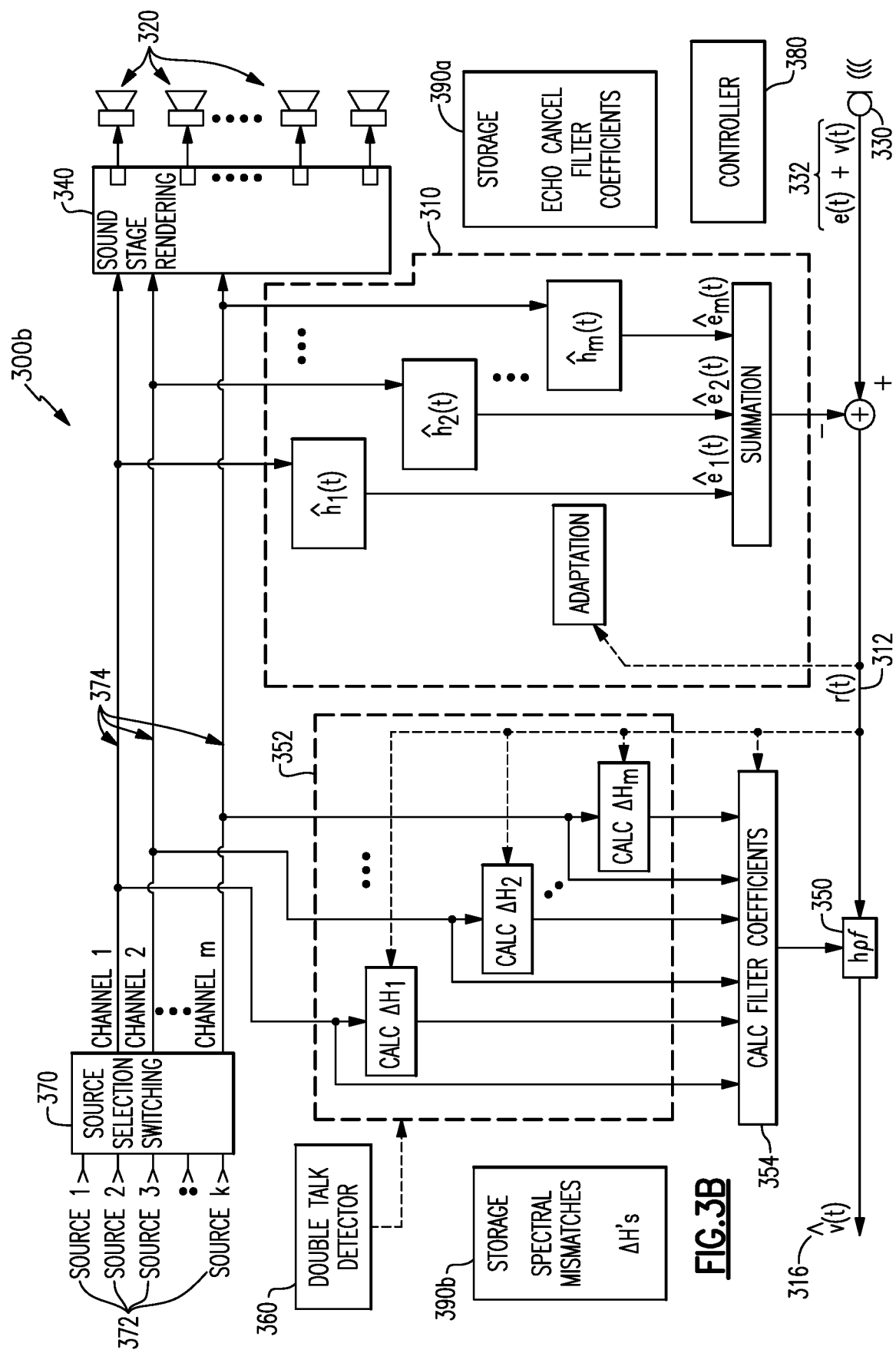
FIG. 3B is a schematic diagram of another example audio system including multi-channel echo cancelation and residual echo suppression.
Figure 3C:
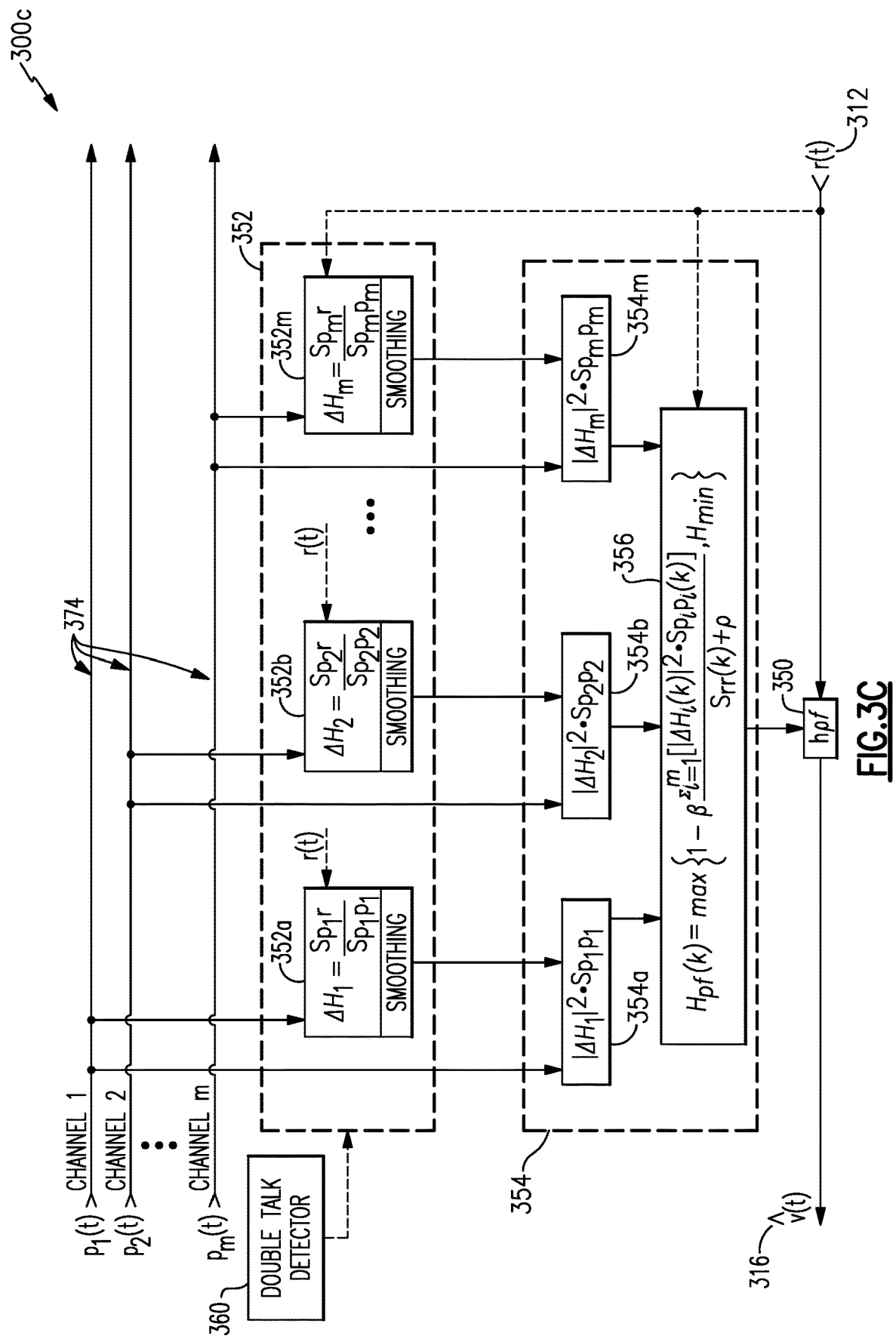
FIG. 3C is a schematic diagram of another example audio system showing details of an example of multi-channel residual echo suppression.

FIG. 3C shows a portion of a further example audio system 300c that illustrates details of at least one example of multi-channel residual echo suppression components. The portions of the audio system 300c shown are similar to those of the audio system 300, with increased detail. The spectral analysis subsystem 352 includes multiple spectral analysis blocks 352a, 352b, . . . 352m, that each calculate a spectral mismatch for a particular content channel 374. Each of the spectral analysis blocks 352a, 352b, . . . 352m calculate a spectral mismatch, $\Delta H$, from a ratio of (a) the cross power spectral density of the respective program content signal, $p_i(t)$, and the residual signal 312, and (b) the power spectral density of the residual signal 312. As illustrated in FIG. 3C, each of the spectral analysis blocks 352a, 352b, . . . 352m may also apply a smoothing algorithm, such as a time-averaging algorithm, to the calculated spectral mismatch. As previously discussed, the spectral analysis subsystem 352 may freeze calculations of spectral mismatches when a double talk detector 360 indicates a double talk condition.

Also shown in FIG. 3C is an example of the coefficient calculation block 354, which includes a spectral block 354a, 354b, . . . 354m for each of the content channels 374 and a coefficient block 356 to combine the outputs of the spectral blocks 354a, 354b, . . . 354m and provide filter coefficients to the post filter 350. As discussed above, the coefficient calculation block 354 may continue operating when a double talk condition is indicated. Accordingly, it should be noted that while the spectral mismatch values may be frozen during double talk, the power spectral density of each program content signal, $S_{p_i p_i}$, may continue to change, as will the power spectral density of the residual signal 312, $S_{rr}$. Each of these power spectral densities that may continue to change during double talk are used by the coefficient calculation block 354, and accordingly the filter coefficients will continue to change during double talk even though the spectral mismatch values may be held constant, i.e., frozen.

Figure 3D:
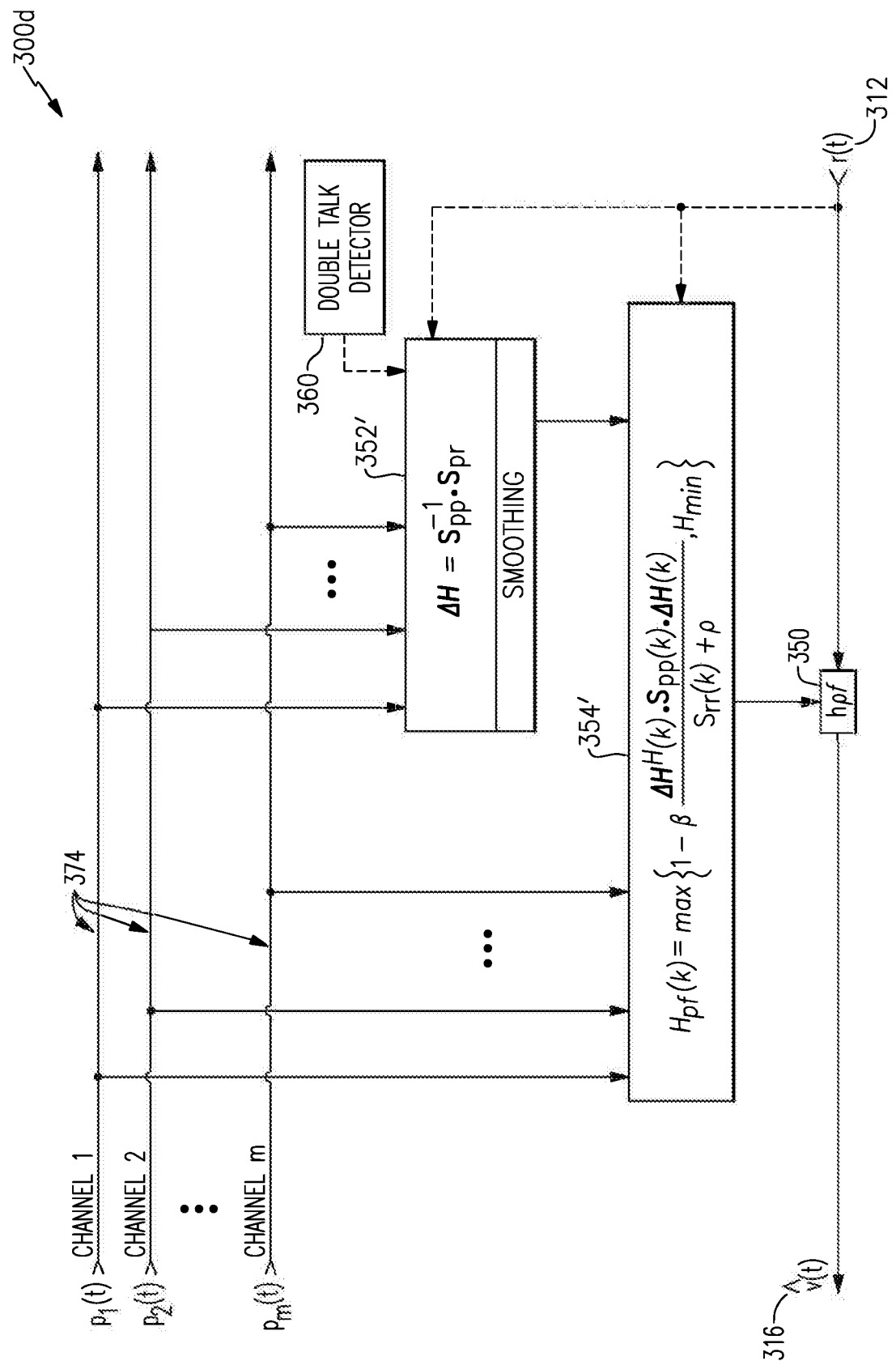
FIG. 3D is a schematic diagram of another example audio system showing details of an example of multi-channel residual echo suppression.

FIGS. 3A-3C and equations (5) and (6) above illustrate an example system for providing residual echo suppression when the program content signals carried by the content channels 374 are statistically independent (e.g., uncorrelated), wherein the relevant spectral mismatch for each program content signal may be determined from each program content signal and the combined resulting (residual) signal from the echo cancelation subsystem. FIG. 3D illustrates an example audio system 300d that may be used for a general case wherein the program content signals carried by the content channels 374 may be correlated, such as when a left and right channel pair have some common content, for example. In this case, the spectral analysis block 352' may calculate a set of spectral mismatches, $\Delta H$, using general equation (7), or similar:

$$\Delta H = S_{pp}^{-1} \cdot S_{pr} \quad (7)$$

Where bold lettering represents an array/matrix, such as $\Delta H$ is an array of spectral mismatches, one for each of "m" program content signals. $S_{pr}$ is an array of cross power spectral densities, each calculated between one program content signal and the resulting signal 312. $S_{pp}$ is an m-by-m matrix of cross power spectral densities, calculated from each of the "m" program content signals with every other of the "m" program content signals. It should be noted that the $S_{pp}$ matrix is inverted in equation (7). It should also be remembered that each spectral mismatch and each power spectral density is itself a set of values, at least one for each frequency bin. Accordingly, the computational cost and complexity of equation (7) may be high, and in some examples an assumed or an enforced independence of the program content signals, as discussed above, may be desirable.

With continued reference to FIG. 3D and the general case where program content signals are not necessarily uncorrelated, the coefficient calculation block 354' may calculate coefficients for the post filter 350 (on a per frequency bin basis, for example) according to equation (8):

$$H_{pf}(k) = \max\left\{1 - \beta \frac{\Delta H^H(k) \cdot S_{pp}(k) \cdot \Delta H(k)}{S_{rr}(k) + \rho}, H_{min}\right\} \quad (8)$$

In equation (8), $\Delta H^H$ represents the Hermitian of $\Delta H$, which is the complex conjugate transpose of $\Delta H$.

As with the example audio system 300b of FIG. 3B, the example audio systems 300c, 300d of FIGS. 3C and 3D, respectively, may also include a storage 390 to store previously calculated spectral mismatches for later use, such as to accommodate a change in sound stage rendering or to revert to an earlier value to accommodate delays in double talk detection.

Figure 4:
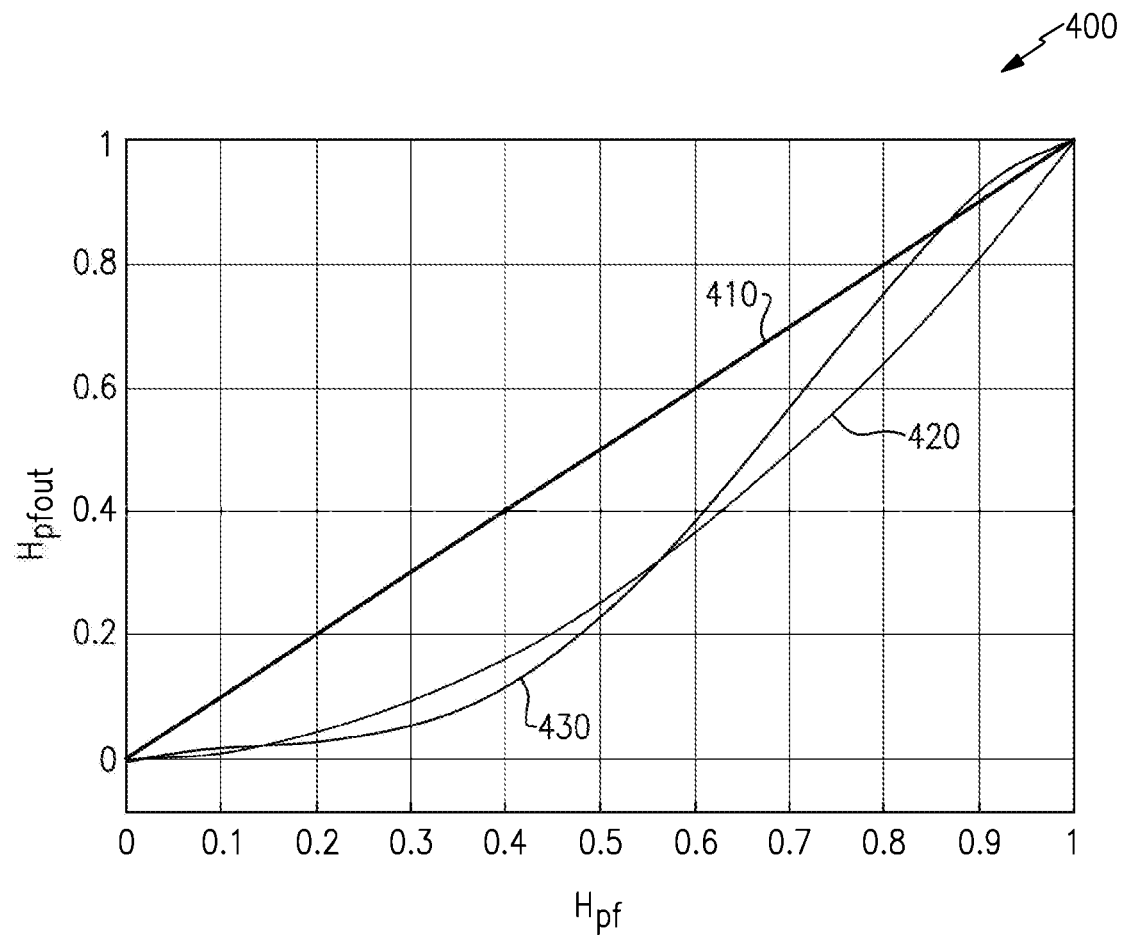
FIG. 4 is a graph of an example mapping of filter coefficients.

Equations (4), (6), and (8) above each illustrate at least one method of calculating a set of coefficients to be used by a post filter, such as the post filter 250 of FIG. 2 in a single channel case, e.g., equation (4), or the post filter 350 of FIGS. 3A-3D in multi-channel cases, e.g., equations (6) and (8), for spectral enhancement of a signal to suppress residual echo from an echo canceler or an echo cancelation subsystem. Some examples apply a further modification to the calculation of post filter coefficients, $H_{pf}$, to improve the overall spectral quality of the output signal, e.g., the estimated voice signal 316. FIG. 4 is a graph 400 that illustrates a number of example mappings of filter coefficient values, $H_{pf}$, as previously described and/or calculated by equations (4), (6), or (8), to new filter coefficient values, $H_{pf\_out}$, that may be applied to the post filter in lieu of the original values, $H_{pf}$. For reference, line 410 illustrates a straight mapping of coefficient values, without any modification. Lines 420 and 430 each illustrate a mapping, or conversion, of filter coefficients to be more aggressive at attenuating a resulting signal, e.g., signal 312, to suppress residual echo. Each of lines 420, 430 represent a function to calculate a filter coefficient, $H_{pf\_out}$, that provides even greater attenuation than an originally calculated filter coefficient, $H_{pf}$, and more so when the originally calculated attenuation is higher (i.e., when $H_{pf}$ is lower). Specifically, line 420 represents a function, such as $f(x)=x^y(y>1)$, based on raising the original $H_{pf}$ to a power, and line 430 represents a polynomial function of $H_{pf}$.

Certain examples include a mapping, or conversion, of the calculated filter coefficients, $H_{pf}$, to more aggressive filter coefficients, $H_{pf\_out}$, in accord with the discussion and examples of FIG. 4. Certain examples may include such non-linear conversion of filter coefficients in addition to or instead of overestimation. An example of no overestimation is given where $\beta=1$ in any of the equations (4), (6), or (8). In certain examples, the overestimation factor, $\beta$, may be a constant value across multiple frequency bins. In other examples, the overestimation factor, $\beta$, may have different values for different frequency bins, e.g., $\beta(k)$.

Figure 5:
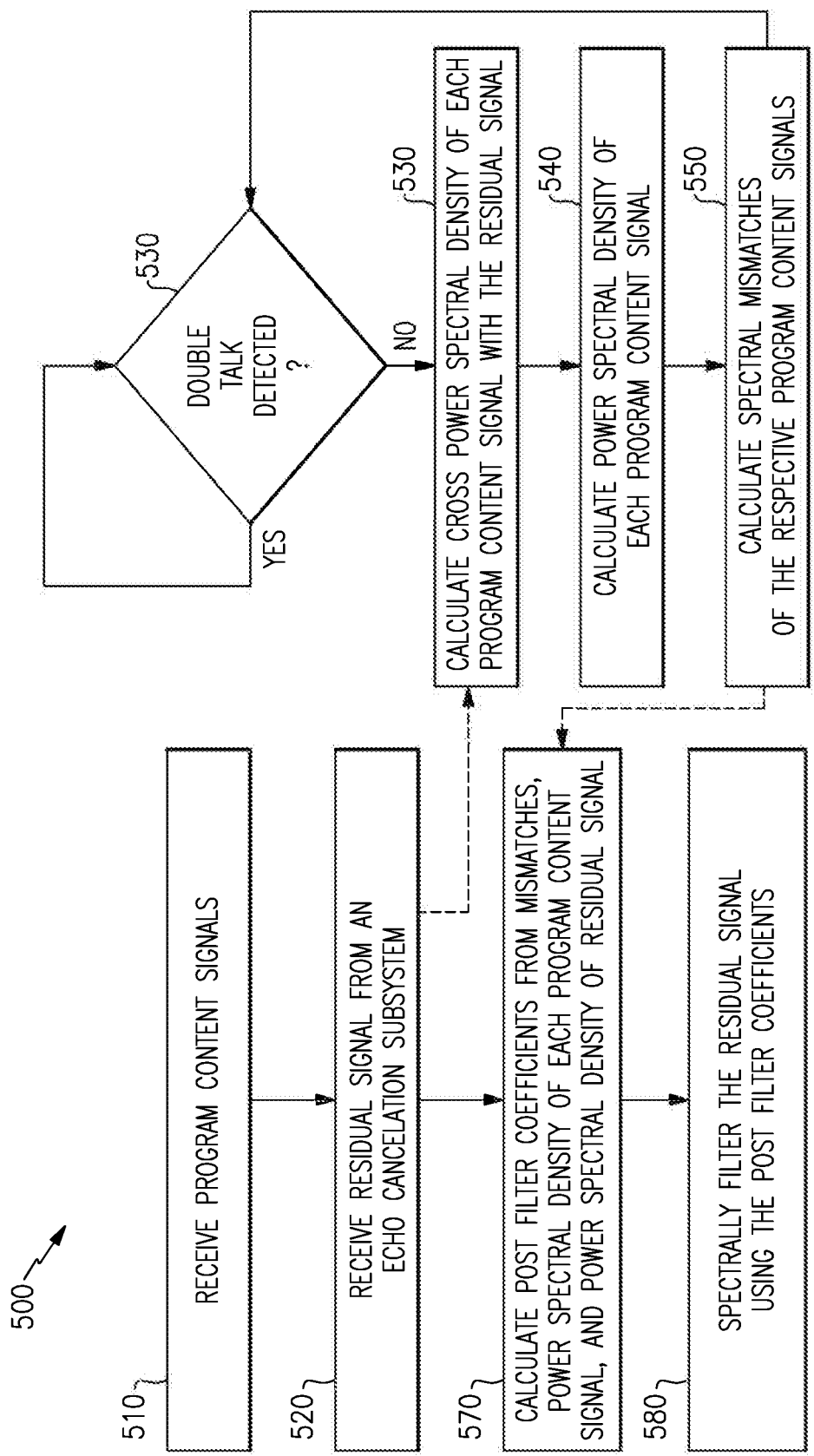
FIG. 5 is a flow diagram of an example method of suppressing residual echo in a multi-channel audio system.

FIG. 5 illustrates an example operational method 500, that may be performed by an audio system such as the audio systems 300 of FIGS. 3A-3C, and may be generalized for the audio system 300d of FIG. 3D to suppress residual echo in a multi-channel environment. The method 500 includes receiving one or more program content signals (block 510) and a residual signal from an echo cancelation subsystem (block 520). Cross power spectral densities are calculated (block 530) between each program content signal and the residual signal, a power spectral density of each program content signal is calculated (block 540), and a spectral mismatch is calculated (block 550) for each program content signal, continuously or at intervals for so long as no double talk is detected (block 560). Filter coefficients are calculated (block 570) from the spectral mismatches, the power spectral density of each program content signal, and the power spectral density of the residual signal. The filter coefficients are provided to a post filter, which filters the residual signal (block 580).

A program content signal may have any suitable spectral range, such as, for example, 20 Hz to 20,000 Hz being an acoustic range typically accepted as matching that of the human ear. In some examples, however, removing an echo signal based upon the program content signal may be limited to a narrower spectrum. In certain examples, the microphone signal may be filtered to a narrower bandwidth because it may be intended to pick up human vocal activity, and may only require a lower frequency bound as low as, e.g., 60 Hz, and/or an upper frequency bound as high as, e.g., 8,000 Hz or 10,000 Hz, for example. In certain embodiments, the microphone signal may be filtered, controlled, or otherwise limited to a frequency spectrum in the range of 60 Hz to 8,000 Hz, or from 100 Hz to 4,000 Hz, or any other suitable range.

In some examples, an audio system may include a plurality of acoustic drivers and/or a plurality of microphones, and may include various processing, which may include array processing, to process signals to the acoustic drivers and/or to process signals from the microphones, or a sub-set of either the acoustic drivers or microphones, as appropriate for various applications and/or changing operational requirements.

It should be understood that many, if not all, of the functions, methods, and/or components of the systems disclosed herein according to various aspects and examples may be implemented or carried out in a digital signal processor (DSP) and/or other circuitry, analog or digital, suitable for performing signal processing and other functions in accord with the aspects and examples disclosed herein. Additionally or alternatively, a microprocessor, a logic controller, logic circuits, field programmable gate array(s) (FPGA), application-specific integrated circuit(s) (ASIC), general computing processor(s), microcontroller(s), and the like, or any combination of these, may be suitable, and may include analog or digital circuit components and/or other components with respect to any particular implementation. Functions and components disclosed herein may operate in the digital domain, the analog domain, or a combination of the two, and certain examples include analog-to-digital converter(s) (ADC) and/or digital-to-analog converter(s) (DAC) where appropriate, despite the lack of illustration of ADC's or DAC's in the various figures. Any suitable hardware and/or software, including firmware and the like, may be configured to carry out or implement components of the aspects and examples disclosed herein, and various implementations of aspects and examples may include components and/or functionality in addition to those disclosed. Various implementations may include stored instructions for a digital signal processor and/or other circuitry to enable the circuitry, at least in part, to perform the functions described herein.

It should be understood that an acoustic transducer, driver, or loudspeaker, may be any of many types of transducers known in the art. For example, an acoustic structure coupled to a magnetic coil positioned in a magnetic field, to cause motion in response to electrical signals received by the coil, may be a suitable acoustic transducer. Additionally, a piezoelectric material may respond to electrical signals by expanding or contracting in one or more dimensions and may be a suitable acoustic transducer. In various examples, acoustic transducers may take other forms.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A method of suppressing residual echo in an audio system, comprising:
   receiving a residual signal from an echo cancelation subsystem;
   receiving a first program content signal;
   determining a first spectral mismatch based at least upon a cross power spectral density of the first program content signal and the residual signal;
   at least one of retrieving, from a memory, an initial first spectral mismatch based upon an operational state of the audio system, and storing, in the memory, the determined first spectral mismatch in association with the operational state of the audio system, the operational state including at least one of a selected sound stage configuration or one or more microphone processing parameters; and
   controlling a filter to filter the residual signal based upon the first spectral mismatch, a spectral density of the first program content signal, and a spectral density of the residual signal.

2. The method of claim 1 wherein controlling the filter includes calculating filter coefficients and providing the filter coefficients to the filter.

3. The method of claim 1 wherein controlling the filter to filter the residual signal is based upon a previously determined first spectral mismatch during a period of time when a double-talk condition is detected.

4. The method of claim 1 further comprising receiving a plurality of microphone signals, array processing the microphone signals into an input signal in accord with one or more microphone processing parameters, and providing the input signal to the echo cancelation subsystem, the operational state of the audio system including the one or more microphone processing parameters.

5. The method of claim 1 wherein determining the first and second spectral mismatches are further based on a cross power spectral density of the first program content signal and the second program content signal.

6. The method of claim 1 further comprising receiving a second program content signal and determining a second spectral mismatch based at least upon a cross power spectral density of the second program content signal and the residual signal, and wherein controlling the filter to filter the residual signal includes controlling the filter to filter the residual signal additionally based upon the second spectral mismatch and the spectral density of the second program content signal.

7. A residual echo suppression system for an audio system, comprising:
   a plurality of content signal inputs, each of the plurality of content signal inputs configured to receive an audio signal;
   a residual input configured to receive a residual signal from an echo cancelation system;
   a memory;
   a processor configured to determine a plurality of spectral mismatches, each of the plurality of spectral mismatches based at least upon a cross power spectral density involving at least one of the audio signals, to store at least one of the plurality of spectral mismatches in the memory, and to associate the stored spectral mismatch with an operational state of the audio system, the operational state including at least one of a selected sound stage configuration or one or more microphone processing parameters; and
   a filter configured to filter the residual signal based at least upon the plurality of spectral mismatches to provide an output signal.

8. The residual echo suppression system of claim 7 wherein the processor is further configured to calculate filter coefficients based at least upon the plurality of spectral mismatches, a spectral density of the residual signal, and a spectral density of each of the audio signals, and to provide the filter coefficients to the filter.

9. The residual echo suppression system of claim 7 wherein the processor is further configured to determine the plurality of spectral mismatches during a period of time when a double-talk condition is not detected, and to maintain previously determined spectral mismatches during a period of time when a double-talk condition is detected.

10. The residual echo suppression system of claim 7 wherein the processor is further configured to retrieve the stored spectral mismatch, based upon the operational state, and to use the retrieved spectral mismatch as at least one of the determined spectral mismatches.

11. The residual echo suppression system of claim 7 further comprising a signal processing subsystem coupled to the plurality of content signal inputs and configured to provide a processed signal based upon at least a portion of the plurality of audio signals to a loudspeaker for rendering an acoustic signal in accord with a sound stage configuration associated with the operational state.

12. The residual echo suppression system of claim 7 wherein the processor is further configured to determine the plurality of spectral mismatches based upon frequency components of 12,000 Hz or less.

13. An audio system comprising:
   a plurality of inputs, each of the plurality of inputs to receive an audio signal;
   a signal processing subsystem coupled to the plurality of inputs and configured to provide a processed signal based upon at least a portion of the plurality of audio signals to a loudspeaker for rendering an acoustic signal;

a microphone input to receive a microphone signal having an echo component of the acoustic signal;

an echo cancelation subsystem configured to provide an estimated echo signal from the plurality of audio signals, to receive the microphone signal, and to subtract the estimated echo signal from the microphone signal to provide a residual signal; and a residual echo suppression subsystem configured to determine a plurality of spectral mismatches, each of the plurality of spectral mismatches based at least upon a cross power spectral density of the residual signal and one of the plurality of audio signals, the residual echo suppression subsystem further configured to store at least one of the plurality of spectral mismatches in a memory, and to associate the stored spectral mismatch with an operational state of the audio system, the operational state including at least one of a selected sound stage configuration or one or more microphone processing parameters, and the residual echo suppression subsystem further configured to filter the residual signal based at least upon the plurality of spectral mismatches to provide an output signal.

14. The audio system of claim 13 wherein the residual echo suppression subsystem is further configured to calculate filter coefficients based at least upon the plurality of spectral mismatches, a spectral density of the residual signal, and a spectral density of each of the audio signals, to filter the residual signal.

15. The audio system of claim 13 wherein the residual echo suppression subsystem is further configured to determine the plurality of spectral mismatches during a period of time when a double-talk condition is not detected, and to maintain previously determined spectral mismatches during a period of time when a double-talk condition is detected.

16. The audio system of claim 13 further comprising a microphone processing subsystem configured to provide the microphone signal to the microphone input based upon a combination of signals from a plurality of microphones.

17. The audio system of claim 16 wherein the operational state includes a microphone processing parameter for the combination of signals from the plurality of microphones.

18. The audio system of claim 13 wherein the residual echo suppression subsystem is further configured to retrieve from a memory a stored spectral mismatch, based upon the operational state, and to use the retrieved spectral mismatch as at least one of the determined spectral mismatches.

* * * * *